Dec. 15, 1936.  F. K. BERRY ET AL  2,064,101
COOKING APPARATUS
Filed Dec. 5, 1934
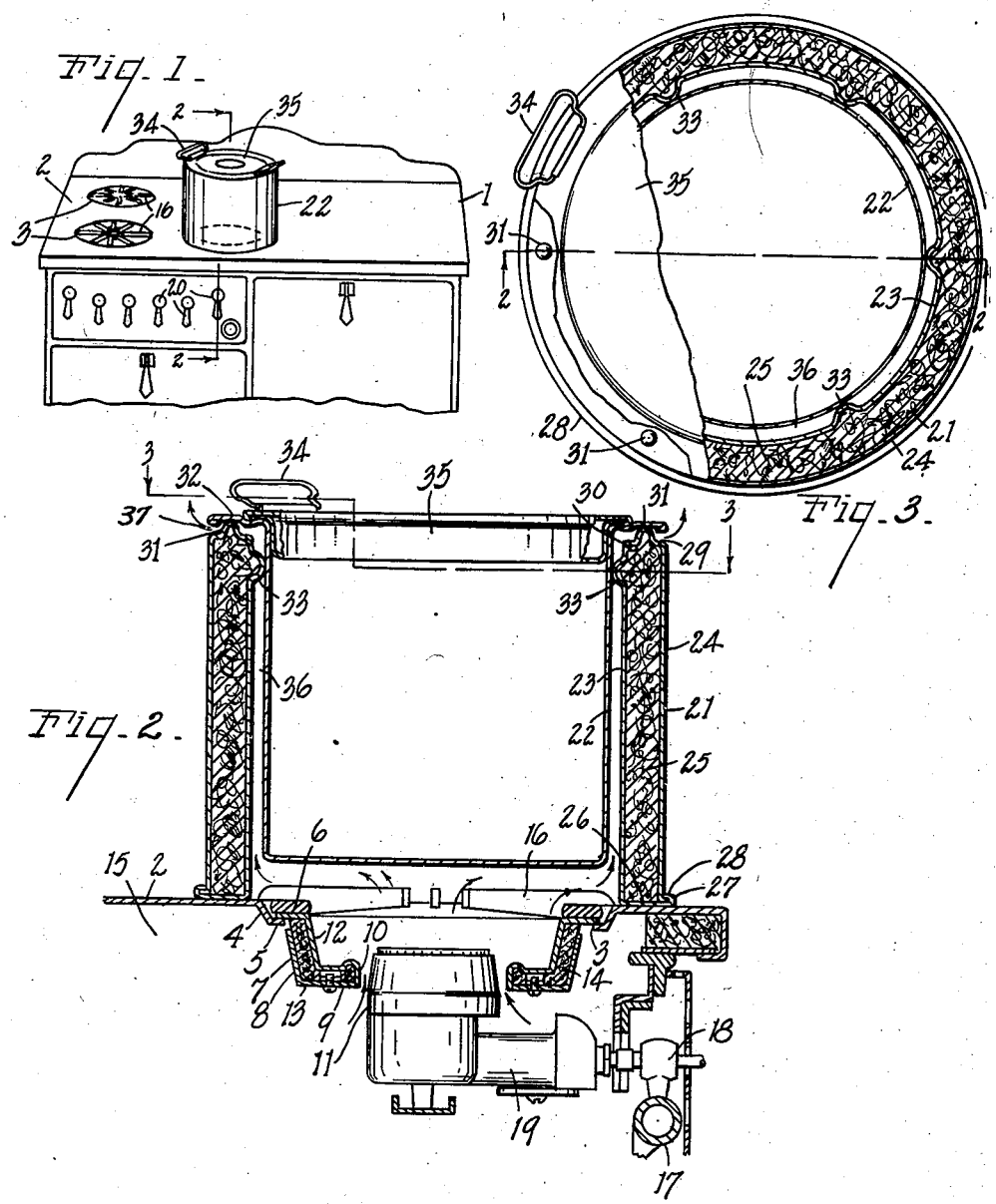
INVENTORS
Frank K. Berry
Alfred J. Reedy
BY
Chappell & Earl
ATTORNEYS Patented Dec. 15, 1936

2,064,101

UNITED STATES PATENT OFFICE 2,064,101

COOKING APPARATUS

Frank K. Berry and Alfred J. Reedy,
Battle Creek, Mich.

Application December 5, 1934, Serial No. 756,118

6 Claims. (Cl. 53—11)

The main objects of this invention are:

First, to provide an improved cooking apparatus wherein the heat of a gas burner is very effectively concentrated on a cooking vessel.

Second, to provide apparatus of the foregoing character which is especially well adapted for use with the so-called cooking top of a gas stove or range.

Third, to provide improved means for directing and utilizing a heat developed by a gas burner.

Objects relating to details and economies of our invention will appear from the description to follow. The invention is defined and pointed out in the claims.

A structure which is a preferred embodiment of our invention is illustrated in the accompanying drawing, in which:

Fig. 1 is a fragmentary perspective view of a gas stove or range embodying features of our invention.

Fig. 2 is an enlarged fragmentary transverse vertical section taken on a line corresponding to line 2—2 of Figs. 1 and 3.

Fig. 3 is a fragmentary view partially in plan and partially in horizontal section on line 3—3 of Fig. 2.

Referring to the drawing, 1 is a gas stove or range having an open cooking top 2 provided with a plurality of burner openings 3. Each of the burner openings 3 is provided with a conical depending peripheral flange 4 terminating in an inturned lower edge providing a burner pan supporting ledge 5. This ledge provides a convenient seat for the annular out-turned top flange 6 of a pan unit 7. The pan unit 7 has a conical wall 8 and a bottom 9 provided with a central opening 10 through which the burner 11 projects upwardly in spaced concentric relation.

The pan unit comprises an inner pan 12 and an outer pan 13 disposed in spaced nested relation, the space between the pans being filled with heat insulating material 14. The surfaces of the pan unit are preferably finished to reflect the heat developed by the burner upwardly and inwardly through the burner opening 3 and to assist the insulating material 14 in preventing the heat from entering the burner chamber 15 under the cooking top. The burner openings are provided with grids 16 which normally act to support cooking utensils, but with my apparatus the grid may be and preferably is removed inasmuch as it serves no useful function.

The burner 11 is supplied with gas from a manifold 17 through the gas valve 18 and connection 19, the gas valve being provided with a control handle 20. By keeping the heat of the burner from entering the burner chamber 15, the gas connections to the burners therein are kept cool—a very desirable feature of our invention.

For use with any one of the burners in the open cooking top, we provide a cylindrical casing 21 which is adapted to support within itself the broiler or cooking container or utensil 22. The casing 21 consists of an inner wall member 23 and an outer wall member 24 arranged in spaced concentric relation, the space between the wall members being filled with heat insulating material 25. The wall members are preferably formed of sheet metal, the inner wall member having an out-turned annular bottom flange 26 constituting the bottom of the casing, the outer edge 27 of the flange being folded upwardly and inwardly over the lower out-turned edge 28 of the outer wall member to connect the parts in fixed assembled relation. At its upper end, the outer wall member is provided with an inturned top flange 29 constituting the top of the container, the inner edge of the flange overlapping the out-turned top flange 30 of the inner wall member.

The top flange 29 is provided with an annular series of spaced indentations forming upwardly extending projections 31 constituting rests adapted to space the top flange 32 of the cooking vessel 22 above the main body of the casing. Likewise, the inner wall member 23 is provided with an annular series of indentations near the top thereof forming internal projections 33 for holding the wall of the container 22 in spaced concentric relation within the casing 21, the internal projections 33 being rounded to provide guides for the container 22 when the latter is inserted in the casing.

The cooking container 22 is provided with handles 34 connected to opposite sides of the top flange 32 thereof for raising and lowering the container within the casing. The container is also provided with a cover 35 which is adapted to fit within the upper end of the container, as shown.

Like the pan unit 7, the casing 21 is preferably provided with a reflecting inner surface for assisting the insulating material in preventing the escape of heat through the wall of the casing. Thus, in the operation of our cooking apparatus the heat generated by the burner 11 is directed upwardly through the burner opening toward the bottom of the cooking container or vessel 22 and thence upwardly through the cylindrical space 36 between the casing and the wall of the container, the flue gases and any remaining heat being finally discharged through the space 37 between the top of the casing and the flange 32, as shown by the arrows. In this way, our apparatus results in the concentration of the heat developed by the burner on the bottom and wall of the cooking container, practically all of the heat developed by the burner being thereby utilized for cooking purposes. Further, the gas connections to the burners within the burner chamber 15 are kept cool and are protected from the heat, as are the other parts of the gas stove.

While we show the grid 16 in place between the bottom of the cooking container and the top of the burner, it is to be understood that this grid is preferably removed before the casing is mounted on the cooking top for a selected burner opening. However, when the grid is left in place as shown by Fig. 2, it acts to control the position of the casing to a set certain extent relative to the periphery of the burner opening.

From the above description of our invention, it will be appreciated by those skilled in the art that we provide a cooking apparatus which is simple and economical in its parts and very efficient and effective in operation, practically all of the heat generated by the burner being utilized for cooking. This not only saves fuel but results in minimizing heating of the parts of the range adjacent the burner.

Inasmuch as a dead air space provides a very good insulator, the insulating material which we prefer to use in our pan unit and casing may be omitted without departing from our invention. Further, the degree of polishing of the surfaces of our casing and pan unit may be varied as desired or the polishing entirely omitted if desired.

We have illustrated and described our improvements in an embodiment which we have found very practical. We have not attempted to illustrate or describe other embodiments or adaptations as it is believed this disclosure will enable those skilled in the art to embody or adapt our improvements as may be desired.

Although we have shown and described a certain specific embodiment of our invention, we are fully aware that many modifications thereof are possible. Our invention, therefore, is not to be restricted except insofar as is necessitated by the prior art and by the spirit of the appended claims.

Having thus described our invention, what we claim as new and desire to secure by Letters Patent is:

1. In cooking apparatus of the character set forth, a cylindrical casing comprising an inner wall member of sheet metal having an out-turned annular bottom flange constituting the bottom of the casing, the inner wall member having an out-turned inner top flange and being provided near its top with an annular series of spaced indentations forming internal projections, an outer wall member of sheet metal concentrically spaced from said inner wall member and having an inturned annular outer top flange constituting the top of the casing and overlapping said out-turned inner top flange, said outer top flange having an annular series of spaced indentations forming upwardly extending external projections, the lower edge of said outer wall member being turned outwardly in overlapping relation with said bottom flange, and the outer edge of said bottom flange being turned upwardly and inwardly over said lower edge to connect the parts in fixed assembled relation, and heat insulating material filling the space between said inner and outer wall members, the latter having a heat reflecting surface.

2. In cooking apparatus of the character set forth, a cylindrical casing comprising an inner wall member having an out-turned annular bottom flange constituting the bottom of the casing, the inner wall member having an out-turned inner top flange and being provided near its top with an annular series of internal projections, an outer wall member concentrically spaced from said inner wall member and having an inturned annular outer top flange constituting the top of the casing and overlapping said out-turned inner top flange, said outer top flange having an annular series of upwardly extending external projections, the lower edge of said outer wall member being turned outwardly in overlapping relation with said bottom flange, and the outer edge of said bottom flange being turned upwardly and inwardly over said lower edge to connect the parts in fixed assembled relation, and heat insulating material filling the space between said inner and outer wall members, the latter having a heat reflecting surface.

3. In cooking apparatus of the character set forth, a casing comprising an inner wall member having an out-turned bottom flange constituting the bottom of the casing, the inner wall member having an out-turned inner top flange and being provided near its top with a series of internal projections, and an outer wall member concentrically spaced from said inner wall member and having an inturned outer top flange constituting the top of the casing and overlapping said out-turned inner top flange, said outer top flange having a series of upwardly extending external projections.

4. In cooking apparatus of the character set forth, a cylindrical casing comprising an inner wall member provided near its top with an annular series of internal projections integral with the member, an outer wall member spaced from said inner wall member, a top member connecting said inner and outer wall members and having an annular series of upwardly extending projections, and a bottom member connecting said inner and outer wall members, and heat insulating material filling the space between said inner and outer wall members, the latter having a heat reflecting surface.

5. In cooking apparatus of the character set forth, a casing comprising an inner wall member provided near its top with an annular series of internal projections integral with the member, an outer wall member spaced from said inner wall member, a top member connecting said inner and outer wall members and having an annular series of upwardly extending projections, and a bottom member connecting said inner and outer wall members.

6. The combination of a cooking container and means for concentrating heat applied to said container, comprising a casing disposed in spaced concentric relation around said container and acting to support the same, said casing being provided with an annular series of internal projections integral with the casing and acting to center the container within the casing, said casing being further provided with a series of integral supporting top projections forming an annular series of spaces through which gases may be discharged from between said container and casing.

FRANK K. BERRY.
ALFRED J. REEDY.